US011241837B2

United States Patent
Lebron et al.

(10) Patent No.: US 11,241,837 B2
(45) Date of Patent: Feb. 8, 2022

(54) SEGMENTS IN VIRTUAL BUILD VOLUMES

(71) Applicant: HEWLETT-PACKARD DEVELOPMENT COMPANY, L.P., Houston, TX (US)

(72) Inventors: Hector Lebron, San Diego, CA (US); Jake Wright, San Diego, CA (US); Stephen G. Rudisill, San Diego, CA (US); Matthew A. Shepherd, Vancouver, WA (US); Vanessa Verzwyvelt, Vancouver, WA (US); Morgan T. Schramm, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 733 days.

(21) Appl. No.: 16/076,240

(22) PCT Filed: Jul. 10, 2017

(86) PCT No.: PCT/US2017/041372
§ 371 (c)(1),
(2) Date: Aug. 7, 2018

(87) PCT Pub. No.: WO2019/013752
PCT Pub. Date: Jan. 17, 2019

(65) Prior Publication Data
US 2021/0170691 A1    Jun. 10, 2021

(51) Int. Cl.
*B29C 64/393*    (2017.01)
*B33Y 10/00*    (2015.01)
(Continued)

(52) U.S. Cl.
CPC .......... *B29C 64/393* (2017.08); *B29C 64/165* (2017.08); *B33Y 10/00* (2014.12);
(Continued)

(58) Field of Classification Search
CPC .................................................. B29C 64/393
See application file for complete search history.

(56) References Cited

U.S. PATENT DOCUMENTS

2005/0088511 A1    4/2005    Jacob
2014/0046469 A1    2/2014    Bickel et al.
(Continued)

FOREIGN PATENT DOCUMENTS

CN    1708391    12/2005
CN    105916662    8/2016
(Continued)

*Primary Examiner* — Larry W Thrower

(57) ABSTRACT

In an example, a virtual build volume comprising a representation of at least a part of an object to be generated in additive manufacturing is segmented into a plurality of nested segments comprising a core segment, an inner peripheral segment and an outer peripheral segment. Additive manufacturing control instructions may be generated for the nested segments. The control instructions for the core segment may provide a first region of the object corresponding to the core segment and having a first color. The control instructions for the outer peripheral segment may provide a second color for a second region of the object corresponding to the outer peripheral segment. The control instructions for the inner peripheral segment may provide a third color for a third region of the object corresponding to the inner peripheral segment, wherein a color of the third region is determined so as to at least partially visually mask the first region.

15 Claims, 4 Drawing Sheets

(51) Int. Cl.
   *B33Y 30/00* (2015.01)
   *B33Y 50/02* (2015.01)
   *B33Y 70/00* (2020.01)
   *B29C 64/165* (2017.01)
   *G05B 19/4099* (2006.01)

(52) U.S. Cl.
   CPC ............... *B33Y 30/00* (2014.12); *B33Y 50/02* (2014.12); *B33Y 70/00* (2014.12); *G05B 19/4099* (2013.01); *B29K 2995/0021* (2013.01); *G05B 2219/49023* (2013.01)

(56) References Cited

U.S. PATENT DOCUMENTS

| | | |
|---|---|---|
| 2014/0048488 A1 | 2/2014 | Mason |
| 2015/0258770 A1 | 9/2015 | Chan et al. |
| 2015/0259548 A1 | 9/2015 | Wang et al. |
| 2016/0137839 A1 | 5/2016 | Rolland et al. |
| 2016/0151979 A1 | 6/2016 | Urban et al. |
| 2016/0168453 A1 | 6/2016 | Florio et al. |
| 2016/0369096 A1 | 12/2016 | Rolland et al. |
| 2018/0071988 A1* | 3/2018 | Emamjomeh .......... B33Y 10/00 |

FOREIGN PATENT DOCUMENTS

| | | |
|---|---|---|
| JP | 2016093914 | 5/2016 |
| JP | 2017511265 | 4/2017 |
| WO | 2015167520 A1 | 11/2015 |
| WO | WO-2016140670 A1 | 9/2016 |
| WO | WO-2016/175817 A1 | 11/2016 |
| WO | WO-2016/186613 A1 | 11/2016 |
| WO | WO-2016186609 | 11/2016 |

\* cited by examiner

SEGMENTS IN VIRTUAL BUILD VOLUMES

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

Another example of a print agent is a coalescence modifying agent (which may be referred to as a modifying or a detailing agent), which acts to modify the effects of a fusing agent and/or energy applied, for example by inhibiting, reducing or increasing coalescence or to assist in producing a particular finish or appearance to an object. A property modification agent, for example comprising a dye, colorant, a conductive agent, an agent to provide transparency or elasticity or the like, may in some examples be used as a fusing agent or a modifying agent, and/or as a print agent to provide a particular property for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define at least a portion of a respective layer of build material that is to be solidified or caused to coalesce by the additive manufacturing system.

Figure 1:
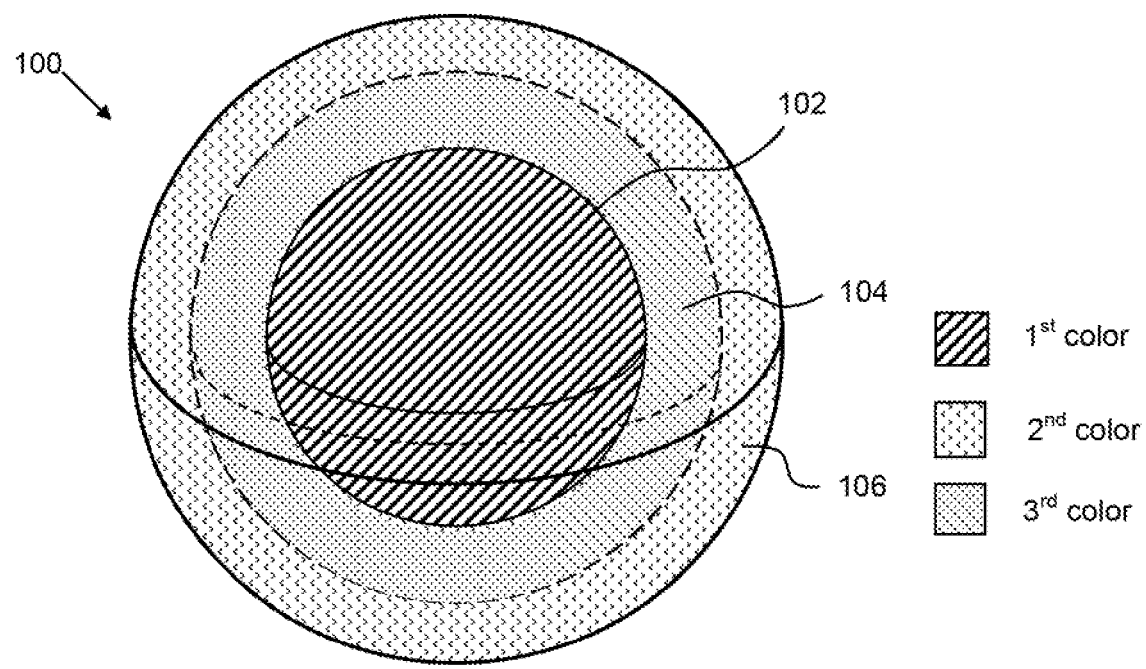
FIG. 1 shows an example of a segmented model.

Examples herein comprise considering an object to be manufactured as a plurality of different model segments, which in turn relate to object regions, to which different processing may be applied. An example of an object 100 which is segmented into object regions/segments is shown in FIG. 1, which comprises a core 102, an inner segment/region 104 and an outer segment/region 106 (wherein segments of a model are processed to form regions of an object). The inner and outer segments in this example represent nested 'shells' of an object to be generated using different processing parameters (e.g. different selections of print agents) to form nested object regions.

When printing 3D color objects, there may be trade-offs between color and mechanical properties. Higher density 3D objects that have significant mechanical strength and functionality can be produced when a greater amount of thermal energy is applied to the build material for fusing the layers together. The amount of thermal energy available for fusing depends in part on the intensity with which the fusing agent absorbs the radiation (its 'absorptance'), and the absorptance of the fusing agent depends in part on the color of the fusing agent. For example, a carbon black composition may be an effective fusing agent as it has a high energy absorptance in the infrared and near infrared range. However, it is dark in color and, even if mixed with colorants, the range of colors, or color gamut, which is accessible using black fusing agent is relatively small.

Other print agents may be used as fusing agents. For example, the absorptance of suitable cyan, magenta, or yellow (C, M, or Y) colorants for use in additive manufacturing, while generally lower than that of, for example, carbon black-based fusing agent, may be sufficiently high that they may function as fusing agents. This may, however, result in an object having a lower level of fusing when compared to build material which is treated with a higher absorptance print agent. This may in turn result in a weaker and/or lower density object. In other words, color objects may have lower densities and/or less mechanical strength than comparable black objects. In another example, the energy provided may be increased to improve fusion, although this may result in unintended color shifts.

Low-tint fusing agents which have a relatively high absorptance (for example for example comprising a Caesium Tungsten. Bronze, or a Caesium Tungsten Oxide composition) and which are lighter in color than a carbon black based print agent may be used as fusing agents. However, these tend to more expensive than carbon black fusing agents.

In the examples herein, by differentiating between segments, a colorful shell may for example be formed around a strong core to which a carbon black based fusing agent is applied. This allows the object to be colorful without unduly compromising its strength. Moreover, while it may be the case that a colored peripheral segment could be determined about a core segment which is fused using a carbon black based fusing agent, the color gamut of resulting object may be reduced by the surface visibility of the underlying core segment (which may be particular the case for partially transparent outer peripheral segments). Therefore, in the examples set out herein, an intermediate segment/object region which provides at least a degree of masking of the color of the core is formed. Providing at least one intermediate peripheral segment may allow for a more gradual transition of properties (e.g. from black to colourful).

For example, a particular intended color may be provided by the outer peripheral region 106 having one color, the inner peripheral region 104 having a different color, and the core 102 of a still further color. The color of the core 102, which is labelled as the first color in FIG. 1 may be at least substantially incidental, being a result of a fusing agent which is selected for its fusing properties. The color of the peripheral regions 104, 106 may be provided by using a combination of colorants. In the example of FIG. 1, the outer peripheral segment is associated with a second color and the inner, or intermediate, peripheral segment is associated with a third color.

In some examples, at least some segments may for example represent object regions which are to be generated using particular combinations of print agents so as to have different color properties, and which may have different mechanical or functional properties.

For the purpose of discussion, the object 100 may be considered to be represented in a manner similar to a 'geological model', having a core (core segment/region 102), a mantel (inner shell 104) and a crust (outer shell 106).

Although in this example the core segment 102 is substantially central within the object 100, this need not be the case in all examples. In addition, while the peripheral segments 104, 106 in this example are concentric, and the boundaries thereof follow the contours of the surface of the object 100, they may lack either or both of these qualities in other examples. Indeed in some examples, there may be a plurality of object core segments 102 around which peripheral segments 104, 106 are formed.

Figure 2:
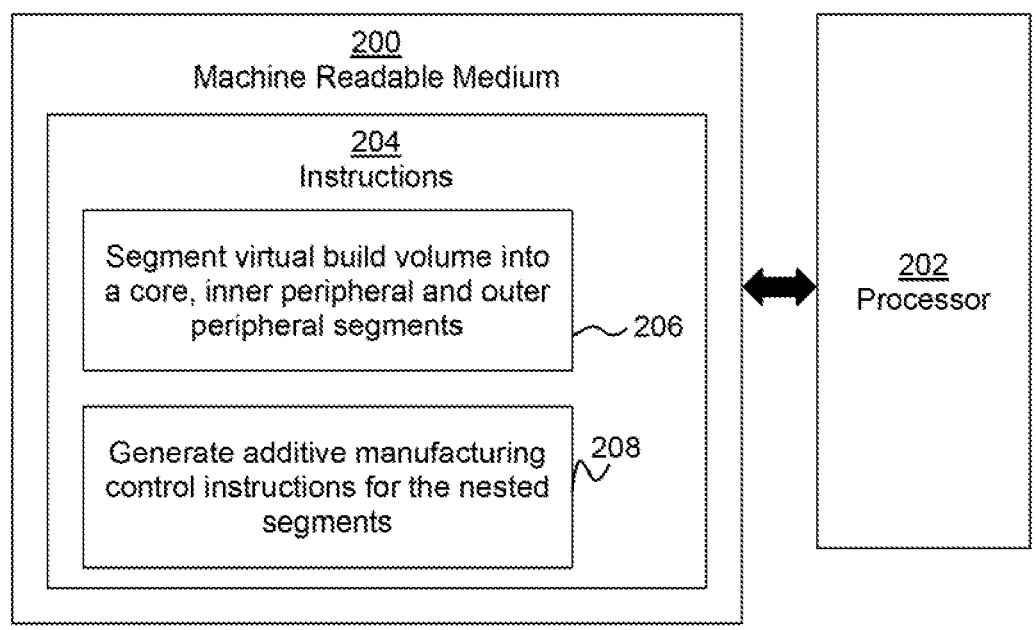
FIG. 2 is an example of a machine readable medium in association with a processor.

FIG. 2 shows a machine readable medium 200, which may be a non-transitory and/or tangible machine readable medium, and which is associated with a processor 202. The machine readable medium 200 stores instructions 204 which, when executed by the processor 202, cause the processor 202 to carry out processes. The instructions 204 comprise instructions 206 to segment a virtual build volume comprising a representation of at least part of an object to be generated in additive manufacturing, wherein the virtual build volume is segmented into a plurality of nested segments comprising a core segment, an inner peripheral segment and an outer peripheral segment.

The inner peripheral segment may be between the core segment and the outer peripheral segment.

The nesting of the segments may be complete or partial (i.e. a peripheral segment may extend around the entire perimeter of the core segment or an inner peripheral segment, or around just part of the perimeter). In some examples, the peripheral segment(s) may form shell(s) around a core segment, as shown in FIG. 1. The core may be any inner segment which has a peripheral segment formed around at least a part thereof.

The virtual build volume may for example comprise a boundary box enclosing the object, may be the size and shape of the object (i.e. follow the surfaces of the object), and/or represent at least part of a build volume in which the object is to be fabricated. In some examples, the virtual build volume may comprise one or more 'slices', each of which may represent a layer of the object to be fabricated in layer-by-layer additive manufacturing of the object, and/or at least part of a fabrication chamber in which the object is to be fabricated.

The representation of the object may for example comprise a data model and may for example be received from a memory, over a network, over a communications link or the like. In some examples, such a data model may for example comprise object model data and object property data. The object model data may define a three-dimensional geometric model of at least part of the model object, including the shape and extent of all or part of an object in a three-dimensional co-ordinate system. In some examples, the data model may represent the surfaces of the object, for example as a mesh. The object model data may for example be generated by a computer aided design (CAD) application. Object property data may define at least one object property for the, or a part of, three-dimensional object to be generated. If no object property data is present the object may have some default properties based on the build material and print agents used. In one example, the object property data may comprise any or any combination of a color, flexibility, elasticity, rigidity, surface roughness, porosity, inter-layer strength, density, transparency, conductivity and the like for at least a part of the object to be generated. The object property data may define multiple object properties for part or parts of an object, and the properties specified may vary over the object.

The instructions 204 further comprise instructions 208 to generate additive manufacturing control instructions for the nested segments. The additive manufacturing control instructions for each segment are generated individually such that:

(i) the control instructions for the core segment are generated so as to provide a first region of the object corresponding to the core segment and having a first color;

(ii) the control instructions for the outer peripheral segment are generated so as to provide a second color for a second region of the object corresponding to the outer peripheral segment; and (iii) the control instructions for the inner peripheral segment are generated so as to provide a third color for a third region of the object corresponding to the inner peripheral segment, wherein the color of the third region is determined so as to at least partially visually mask the first region.

Masking the first region within the object may increase an accessible apparent color gamut of the object, for example increasing an accessible color brightness. In some examples, the color of the third region may comprise a relatively light color, so as to provide a light background for the second region (the outer peripheral segment). In some examples, the third region may be relatively opaque, and/or have a thickness so as to provide a reasonable degree of masking of the core. In some examples, the color of the third region may comprise a color which is intermediate to the color of the core and the second region, so as to mitigate the visual impact of the core on the appearance of the object. The color, opacity, number of nested regions and their thickness may all have an impact, individually or in combination, on the degree to which the appearance of the core is masked. Moreover, in some examples, the degree of masking may be selected based on the intended color of the object: lighter objects may be associated with a greater degree of masking (e.g. thicker, more opaque and/or more numerous regions) than darker objects.

In some examples, the control instructions for the second region specify the use of a low-tint fusing agent and at least one colorant. This may allow a large color gamut to be accessed for the second region without undue risk of color change due to over-heating. In some examples, the control instructions for the third region may also specify the use of a low-tint fusing agent and at least one colorant. This also provides a large color gamut for this region. In some examples, at least some darker fusing agent, for example, carbon-black based fusing agent may be used in the third region. In some examples, the control instructions specify the use of a default print agent, which may be a carbon black fusing agent, for the core. The color of the core may be at least somewhat arbitrary, for example being a result of a selected fusing agent, whereas the color of the second and third region may be predetermined or specified, and print instructions may be determined so as to provide such a color (for example comprising colorants or the like).

In some examples, the print instructions for the third (intermediate) region may be determined to access a smaller color gamut than the color gamut which is accessible in the second region.

Generating control instructions may for example comprise using mapping resources such as a look-up table or mapping algorithm to identity print agent amounts and/or combinations to apply to an object region corresponding to a particular segment, given target properties for that region. In some examples, different mapping resources may associated with different segments.

For example, a mapping resource for the first region (the core segment) may map properties to a coverage of a fusing agent, and in one example the possible printing instructions specify different amounts of fusing agent, which in some examples is a carbon-based fusing agent, and no other print agents. In other words, in some examples, the core may be generated with carbon black fusing agent, with no other agents being available for selection, although the amount of carbon black fusing agent is variable. For example the amount may be varied based on thermal considerations (less fusing agent may be placed in regions of an object which may otherwise overheat in object generation, more fusing agent may be placed in regions of an object which may otherwise fail to reach its fusing temperature in object generation), or other object property specifications, such as strength.

A mapping resource for the second and third region may allow selection of a wider range of print agents than are available for the first region, for example including at least one colorant. In one examples, the selection may be made from a set of print agents comprising a Cyan, Magenta, Yellow and black (Key) (CMYK) color set (where the K may be provided by a cosmetic black colorant, selected for its color providing qualities, and/or a carbon black fusing agent). The print agent set may comprise low-tint fusing agent. In other examples, other sets of print agents may be provided.

In some examples, the mappings for the third region may be designed so as to restrict amounts of at least one colorant and/or low-tint fusing agent when compared to the combinations accessible in the second region. This may mean that the accessible gamut is lower, but as the third region may not be directly viewed by a user (instead being viewed via the second region), this may be acceptable and may reduce costs associated with print agents.

In same example, therefore, the accessible gamut varies between the regions. This may for example result in coarser color match between a specified color and a generated color in some regions when compared to others. For example, while the target color for an object may be a particular green, the color mapping for an outer region may closely match the intended green, whereas the color mapping for an inner, or intermediate, region may result in a green which is less closely matched, but which provides a 'background' which is sufficiently similar to the intended green that the perceived color matches the intended green closely. Providing fewer mappings reduces storage resources consumed any may simplify the specification of print instructions (as more of a volume of the object may be manufactured with a common print instruction). Thus, by providing smaller gamuts for at least some segments/regions, processing resources may be kept low.

Figure 3:
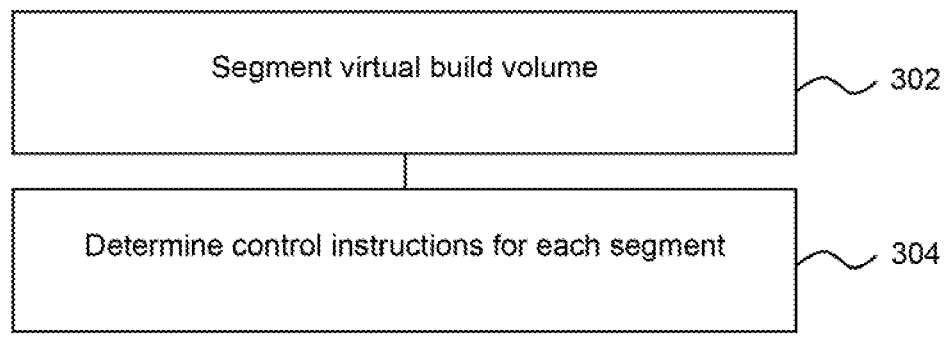
FIG. 3 is an example of a method for generating a segmented data model for an object to be generated in additive manufacturing.

FIG. 3 shows an example of a method which may be carried out by the processor 202 carrying out instructions stored on the machine readable medium 200.

Block 302 comprising segmenting a virtual build volume, which in this example is a 'slice' of a virtual representation of a fabrication chamber. The slice corresponds to a single layer of the object which is to be generated in an additive manufacturing process. In addition to the core segment, the inner peripheral segment and the outer peripheral segment described in relation to FIGS. 1 and 2, the segmentation comprises a first and a second external peripheral segment. These segments are external to the representation of the object within the virtual build volume. Block 304 comprises determining control instructions for each segment.

The control instructions for the core, the inner peripheral segment and the outer peripheral segment may be generated as described above. The control instructions for the first external peripheral segment are generated so as to provide the second color for a region of build material which is external to the object. For example, this may comprise using a mapping resource which specifies the use of a fusion inhibiting agent and at least one colorant.

In some examples, build material from outside the object may adhere or partial fuse to the surfaces of the object, which can decrease the quality of the appearance of the object. For example, this may occur when unfused or partially fused build material having a white appearance adheres to the surface of the object. Therefore, in some examples, color may be added to a region of build material corresponding to an external segment to match the color of the object being generated. In other words, the colour may be applied to what is intended to be outside of the object being generated, as some of the build material to which the color is applied may become attached to the object.

The fusion inhibiting agent may comprise a coolant, for example water or some other substance which tends to inhibit fusion (e.g., an alcohol, a glycol or the like, for example ethanol, ethylene glycol, glycerin/glycerol, and/or propylene glycol). The use of fusion inhibiting agent may assist in providing well defined object boundaries, and limiting accidental fusion in portions of a layer of build material where fusion is not intended.

The fusion inhibiting agent may have a color, which may be taken into account when determining what colorants are applied to provide the target color. The first external peripheral segment may correspond to a region of a layer of build material which is not intended to form part of the object under generation. The first external peripheral segment may be adjacent to the outer peripheral segment. For example, the first external peripheral segment may comprise a border region which surrounds at least part of the outer peripheral segment of the slice which is to be solidified to provide a layer of the object. In examples in which the object as a whale is segmented, the first external peripheral segment may border an outer peripheral segment to be formed in a different layer (and which therefore may be represented in a different slice).

The second external peripheral segment is also external to the representation of the object within the virtual build volume, and in some examples, is external or peripheral to the first external peripheral segment. The control instructions for the second external segment may be generated to specify the application of a fusion inhibiting agent so as to minimise a color change in a further region of build material which is external to the object. This may for example comprise specifying the application of just fusion inhibiting agent, and no colorant.

As applying color to a region which is intended to be external to the object utilises resources and/or may impact the recyclability of the build material, such a segment may designed to be relatively thin, for example, extending across a region which may be heated by proximity to the fused object region. However, this may not provide fusion inhibition in all areas which are at risk of fusion and therefore an additional region of build material may be treated with fusion inhibiting agent. In some examples, the remaining region of the slice after the core segment, inner peripheral segment, the outer peripheral segment and the first external peripheral segment have been defined may comprise the second external peripheral segment.

Figure 4A:
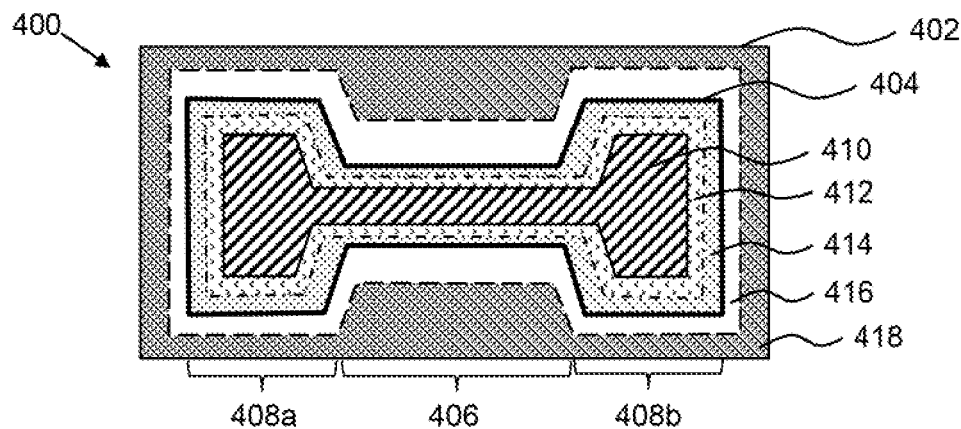
FIGS. 4A and 4B show examples of segmented models.

FIG. 4A shows a plan view of an example of a slice 400 of a virtual build volume 402 comprising an object 404 to be generated. In this example, the object 404 comprises an elongate structure with a narrow central section 406 and two wider end sections 408a, 408b. In this example, the core segment 410 extends towards either end of the object via the central section 406. An inner 412 and an outer 414 peripheral segment are defined. A first 416 and a second 418 external peripheral segment are defined outside the object. To continue the example of a geological model above, the external peripheral segments 416, 418 may be thought of as comprising the 'atmosphere' of the object. In this example, the second external peripheral segment extends to fill the build volume 402, but this may not be the case in all examples.

Figure 4B:
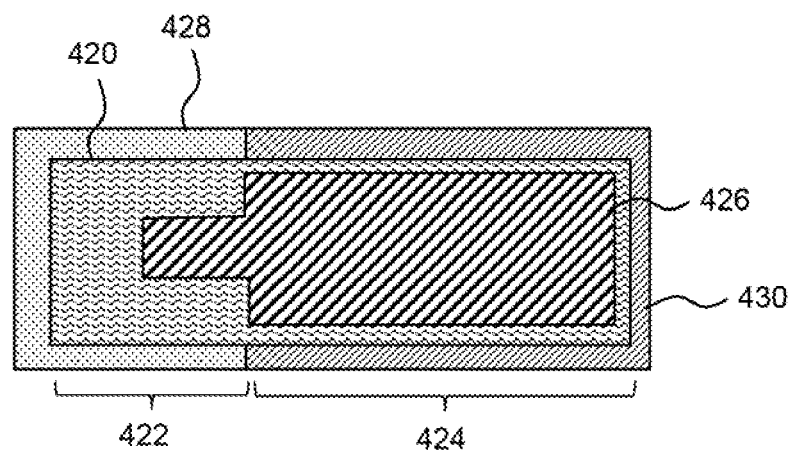

FIG. 4B shows a plan view of an example of a slice of a virtual build volume for generating a different object to that shown in FIG. 4A, in which an inner peripheral segment 420 is wider in a first section 422 than in a second section 424 of the build volume (and a core segment 426 is correspondingly narrower in the first section 422 than in the second section 424). Two outer peripheral segments 428, 430 are of constant (and in this example, equal) thickness. A first outer peripheral segment 428 lies in the first section 422 of the build volume and the second outer peripheral segment 430 lies in the second section 424 of the build volume. In this example, the color of the first outer peripheral segment 428 may be lighter than the color of the second outer peripheral segment 430.

The increased thickness of the inner peripheral segment 420 in the first section 422 may provide a higher degree of color masking, which may be appropriate given the lighter overlying color. In another example, the thickness may vary based on transparency, or an appearance quality specification, or for some other reason which means that increased masking is appropriate. In other examples, a similar affect may be achieved by increasing the thickness of an outer peripheral portion where increased masking is sought. However, there may be a greater level of versatility associated with the inner peripheral segments than the outer peripheral segments (for example, a color match may be less accurate (for example, a choice of agents to provide a target color may be less constrained as the color may be matched less precisely), and/or the choice of print agent may include carbon black whereas this may be inaccessible for the outer peripheral segment), in some examples it may be the inner peripheral segments tend to vary in thickness in preference to the outer peripheral segments.

Varying the thickness of peripheral segments may also allow other trade-offs between properties. For example if the peripheral segments 420, 428, 430 are to be processed to provide a colourful shell and the core 426 is to be processed to provide strength (for example, comprising a high proportion of 'carbon black' fusing agent), there may be different trade-offs between the thickness of the first and second portion of a build volume: the first section 422 may be more colorful than the second section 424 as it has a thicker peripheral segment 420. However, the second section 424 may be relatively strong as, as described above, colored object portions may have a lower strength due to their generally lower capacity to absorb radiation.

Additional peripheral segments may be formed in other examples.

Where slices of the object are formed into segments, this may be carried out independently for different slices. For example, a core segment in one slice may be aligned with, partially aligned with, or non-overlapping to a core segment in a previous or subsequent slice. Different slices may have differing numbers of segments.

In some examples, at least one of a number of segments and a thickness of the segments for an object region is determined based on a local object geometry.

For example, the local geometry of the object at each point where the segment may exist may be considered. When considering a slice of the object, this may comprise a cross-section of the slice at that point. Where the object as a whole is to be segmented, the size of an object feature may be determined. In one example this may comprise integrating for 'voxel density'. A voxel may describe a region of the model and is analogous to a three dimensional pixel. The voxels may be of a consistent shape and size, in some examples being cuboids which are determined such that each voxel can be individually addressed by an object generation apparatus (although such apparatus may also be able to apply print agents with sub-voxel resolution). In some examples, the object properties are specified at voxel resolution.

Integrating for voxel density may comprise determining the number of voxels in, for example, a fixed spherical radius which contains part of an object model to determine local feature size (or circular radius in a slice). In such an example, if there is a high proportion of voxels within this local neighbourhood which are filled with the object, it may be determined that the feature is relatively large. If there are few voxels filled in the local neighbourhood, a small feature may be identified. In other examples, feature size may be determined in some other manner, for example having been tagged by a user or the like.

The visual requirements for color may vary over an object: regions of the object which are relatively small or geometrically complex (the human eye being relatively less sensitive to color variations over such areas) may be printed with a lower quality standard applied to color without sacrificing the perceived color quality of the object. Thus a peripheral segment may be thinner in such sections and a use of colored print agents may be reduced than in examples where such a segment was thicker, and/or at least one peripheral segment specified for at least one object region may not be provided in such a region. In another example, the bottom section of an object may have different dimensional tolerances or strength properties than the top of a part. A volume of a core segment may be increased in such an object portion and/the number of peripheral segments may be reduced in such an area. As a fine feature may be weaker than parts with a larger cross-section, any core may for example constitute a relatively large proportion of the cross-sectional area of the object at such a point (which may for example sacrifice colorfulness, although as noted above, this may be less critical for smaller areas). In addition, this may allow for different thermal properties during a fusing process depending on a location of an object. For example, initial layers (i.e. those formed earlier in additive manufacturing) may, by specifying larger cores or inner segments for such layers, be provided with higher amounts of fusing agent (or of a more effective fusing agent) than upper layers, which may absorb heat from a previous layer.

Thus in some examples, not all object regions may be associated with the specification of inner and outer peripheral segments, and/or in some examples, in which a plurality of segments may be specified, this may vary over the object based on local geometry.

As mentioned above, in some examples, at least one peripheral segment may be external to the model of the object, comprising an 'atmosphere' segment. This may for example be used to control an extent to which fusing inhibiting or detailing agent is applied about the object. As such agents can be thought of heat reducing, this may be tailored to the amount of heat likely to be generated in a portion of the object: generally, object portions of smaller cross section may generate less heat than object portions of larger cross section. Thus, a region of a smaller object features may not have any external segments specified, or such segments may be thin.

In some examples, as has been mentioned above, the thickness of the segments may be moderated based on local object geometry (which may be a thickness in two or three dimensions) of at least one peripheral segment around the object core segment.

In some examples, a segment thickness may be sacrificed, for example, to allow another segment to occupy a greater volumetric proportion. For example, an outer peripheral segment may be reduced in width to allow an inner segment (which may be the core segment or an inner peripheral segment) to have a particular strength, fusing heat, to have a threshold size, or the like. This may be based on a local feature size, for example the cross sectional area of the object at a location. In another example, determining the thickness based on object geometry may comprise determining a location of a segment (or part of the segment) within an object: for example, higher parts of the object may be associated with a different segment thickness than lower parts, and/or upwards facing faces may be associated with a different segment thickness than downwards facing faces, which may take into account thermal consideration during manufacture, or the like.

In some examples, the thickness may be based on an intended appearance. For example, relatively opaque and/or dark colored segments may be thinner than relatively transparent and/or light colored segments. The color, opacity, number of nested regions and their thickness may all have an impact, individually or in combination, on the degree to which the impact of the appearance of the core on the appearance of the object is masked.

Figure 5:
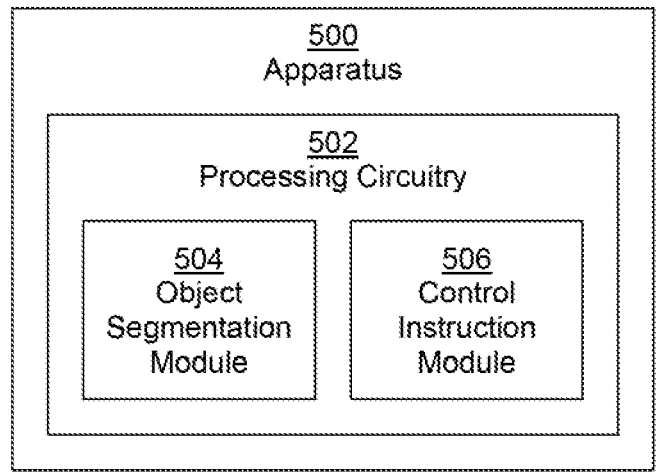
FIGS. 5 and 6 are examples of apparatus for processing data relating to additive manufacturing.

FIG. 5 is an example of an apparatus 500 comprising processing circuitry 502. In this example the processing circuitry 502 comprises an object segmentation module 504 and a control instruction module 506. In use of the apparatus 500, the object segmentation module 504 represents a virtual build volume comprising at least part of an object to be generated in additive manufacturing as a plurality of nested segments comprising an object core segment, an inner peripheral segment and an outer peripheral segment. The control instruction module 506 generates control instructions for generating an object, wherein the generation of control instructions by the control instruction module is such that:

(i) the control instructions for the core segment are generated so as to provide a first region of the object corresponding to the core segment having a first color;
(ii) the control instructions for the outer peripheral segment are generated so as to provide a second color for a second region of the object corresponding to the outer peripheral segment; and
(iii) the control instructions for the inner peripheral segment are generated so as to provide a third color for a third region of the object corresponding to the inner peripheral segment, wherein the color of the third region is determined so as to increase an accessible color gamut of the object.

For example, this may be the color gamut of the object's surfaces as viewed externally. In other words, the apparent color gamut of the second portion (i.e. as observed by a viewer from an external view point) may be increased by selecting a color for the third region. The gamut may be increased compared to the accessible gamut absent such third region. For example, the object may be perceived to have a color which could not be achieved in practice absent the intervening third portion, given the existence of the core. The third color may for example be relatively light and/or be closer to the second color than the first color (i.e. the color difference between the first color and the second color may be greater than the color difference between the third color and the second color).

The shape of the peripheral segment(s) may follow the contours of the surfaces of an object or may differ therefrom. In some examples, the object segmentation module 504 may generate the virtual build volume from a received object model and generating the virtual build volume may comprise modifying the received object model, for example by segmenting the received object model.

Figure 6:
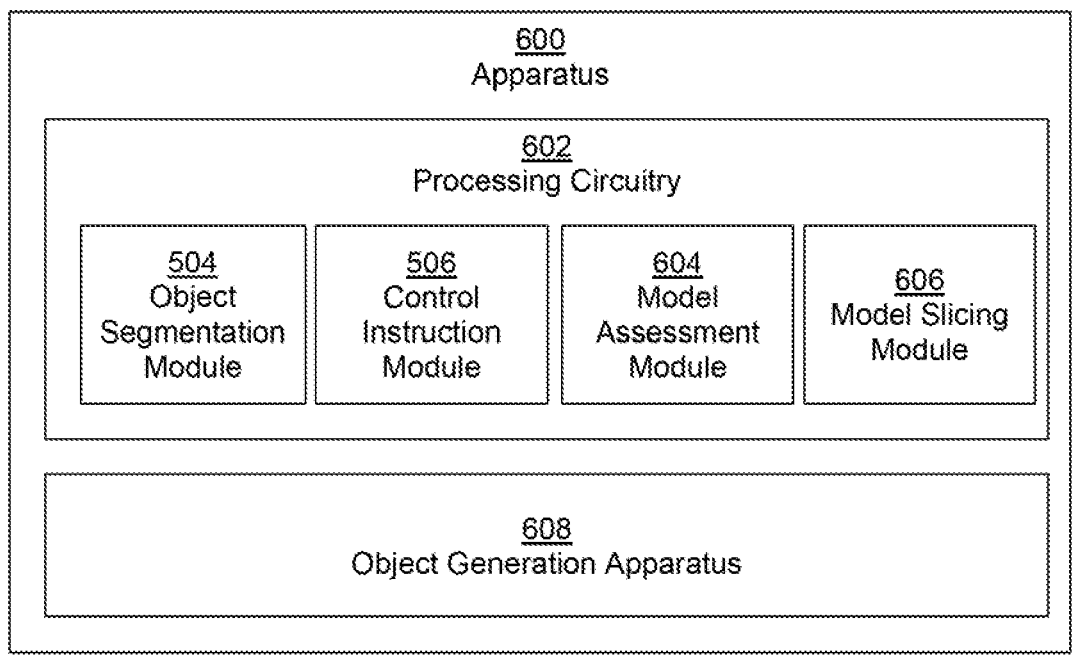

FIG. 6 shows an example of an apparatus 600 comprising processing circuitry 602 which comprises the object segmentation module 504 and the control instruction module 506, as well as a model assessment module 604, a model slicing module 606 and an object generation apparatus 608.

In use of the apparatus 600, the model assessment module 604 determines, from data relating to the object, at least one of a relative volumetric composition and a shape for the segments. The shape may be determined such that at least one peripheral segment has a variable thickness. In some examples, the model assessment module 604 may determine localised relative volumetric compositions for the segments within the object based on a local geometry of the object and at least one intended object property. For example, in the region of a smaller object feature, a core segment may be occupy a relatively larger relative volume than in the region of a larger object feature. In another example, in a lower region of the object, a core segment may be occupy a relatively larger relative volume than in a higher region of the object. In another example, in an intended front face of an object, a peripheral segment (for example, an outer peripheral segment) may occupy a higher relative volume than in an intended rear or bottom face, in which a lower appearance quality level may be tolerated.

In use of the apparatus 600, the model slicing module 606 may represent the object model as a plurality of slices corresponding to an integer number of object layers to be generated in layer by layer additive manufacturing. In some examples, one layer is represented by each slice. The slicing may occur before or after the object is segmented. In some examples, the slicing occurs after control instructions have been generated. When the slicing is carried out relatively early in the process, this allows the slices to be treated separately, which may allow for efficient use of data processing resources (for example, slices corresponding to layers to be formed later may be processed after slices corresponding to layers to formed earlier, and in some examples while fabrication of earlier layers has begun).

The object generation apparatus 608 is to generate the object according to the control instructions, and may to that end comprise additional components such as a print bed, build material applicator(s), print agent applicator(s), print agent source(s), heat source(s) and the like, not described in detail herein.

Figure 7:
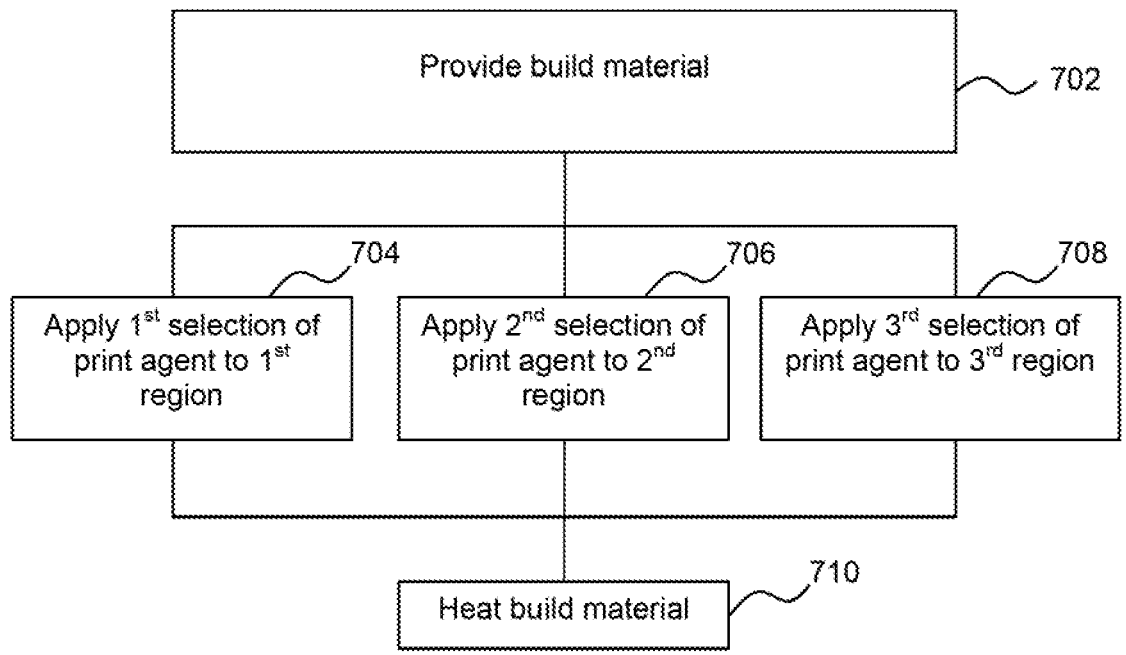
FIGS. 7 and 8 are examples of methods for generating an object.

In some examples, the object generation apparatus 608 may carry out a method as described in relation to FIG. 7 (although the method may be carried out by other object generation apparatus).

The apparatus 600 may carry out the method of FIG. 3.

The method of FIG. 7 comprises a method of generating an object using additive manufacturing which comprises, in block 702, providing build material. For example, one or more layers of build material may be formed of a granular material, such as a granular plastic material. The build material may be a powder, a liquid, a paste, or a gel. Examples of build material include semi-crystalline thermoplastic materials. A layer may for example be formed on a print bed, or on a previously formed and processed layer of build material.

Block 704 comprises applying, to a first region of the build material which is to be fused in additive manufacturing, a first selection of print agent. Block 706 comprises applying, to a second region of the build material which is to be fused in additive manufacturing, a second selection of print agent, wherein the second selection comprises at least one colorant. Block 708 comprises applying, to a third region of the build material which is to be fused in additive manufacturing and which is between the first region and the second region, a third selection of print agent, wherein the third selection is to at least partially visually mask the first region. In some example the first region may be visually masked when viewed from a surface of an object being generated.

Blocks 704, 706 and 708 may be carried out in an overlapping timeframe, for example as a print agent applicator is scanned over a layer of build material. As such, application of the print agent to the first, second and third regions may be interleaved depending on the position of the print agent applicator over the layer of build material.

In some examples, application of print agent is carried out using a print agent distributor, for example a print head which may dispense print agent using 'inkjet' techniques or the like, and which may for example move relative to the layer of print agent, and may perform at least one printing pass of the layer of build material. The print agent may be applied from a plurality of print agent sources to provide the target selection (for example using appropriate halftoning techniques), or may be pre-mixed to provide the target selection.

Where colorant is applied, the colorant may in some examples comprise a colored print agent, a selection of a plurality of colored agents, or at least one colored agent and a fusing agent. The colorant may comprise organic pigment, inorganic pigment, organic dye, thermochromic dye such as leuco dye, or the like. The colorant may be selected to (in some examples in combination with a fusing agent) provide a target color within a color space which may be applied to the layer of build material. For example, the colorant may comprise a choice of different colored agents, for example, from a CYMK (cyan, magenta, yellow, and black) color set, in some examples with the addition of orange green and violet colored agents, and/or light versions of the CYM agents, and the like. In other examples, alternative colorant sets may be provided.

Applying print agent may comprise applying a fusing agent to the first region. The fusing agent may be an absorber of IR radiation, visual radiation, near IR radiation or the like.

For example, the fusing agent may comprise an agent having a high energy absorptance (noting that a material's "absorptance" relates to its effectiveness in absorbing radiant energy) in the infra-red and/or near infrared range, for example a carbon black-based print agent, or an alternative (for example a low-tint) fusing agent, for example comprising a Caesium Tungsten Bronze, or a Caesium Tungsten Oxide composition which may be lighter in color than a carbon black based print agent.

In other examples, the colorant(s) themselves may be sufficiently efficient thermal absorbers to act as fusing agent. For example, the energy may be infrared energy: any agent which is not transparent in the infrared region will absorb at least same energy which may cause heating. In some examples, radiation to be applied may be increased so as to cause fusion with applied agents of relatively low absorptance. In some examples, print agent may be applied to comprise fusing agent for some target colors and not for others to achieve a print agent with an acceptable thermal absorptance.

In some examples, while a fusing agent may be black in color, a black colorant of a colorant set such as the CMYK colorant set may comprise a cosmetic black colorant, selected for its color properties, whereas a black colored fusing agent may comprise a material (such as carbon black) selected for its absorptance in the near-infrared range. In other words, a cosmetic black colorant may be provided in addition to at least one fusing agent, even where that fusing agent is black in color. The cosmetic black agent may have lower absorptance that the fusing agent in a waveband of radiation intended to result in heating of the build material.

Block 710 comprises heating the build material by exposing the build material to radiation, for example so as to cause fusing of the first, second and third region.

For example, this may comprise exposing a layer containing the regions to a heat source such as a heat lamp. In some examples, heating is carried out at least partially concurrently with print agent application (for example, a print agent applicator may comprise a heat source). Heating may be carried out before, during and/or after print agent application.

In some examples, the method may be carried out over each of a plurality of layers of build material until an object is formed.

Figure 8:
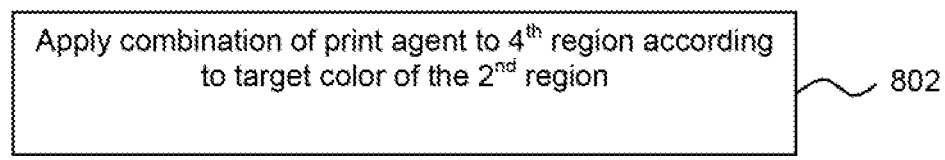

FIG. 8 is an example of a method which may be integrated with the method of FIG. 7. Block 802 comprises applying, to a fourth region of the build material which is adjacent to the second region, print agent comprising a combination of a fusion inhibiting agent and colorant, wherein the combination is applied according to a target color of the second region. The fourth region may be intended to remain unfused in additive manufacturing (i.e. corresponding to first external peripheral segment described above).

In some examples, the colored print agents applied to the fourth portion may be taken from the same set of colored print agents as is applied to the second and/or third region. For example, a selection from the same set of CMYK color agents may be applied to different regions, but the relative amounts of each color agent may differ between regions.

In some examples, an amount of fusion inhibiting agent to be applied in block 802 may be determined based on an energy absorptance of the colorant applied to the fourth region. For example, if a colorant (or combination of colored agents) with a relatively high energy absorptance is applied to the fourth region, this will mean that the colorant at the fourth region comparatively absorbs more thermal energy during a fusion process of the first, second and third regions than if the colorant has a relatively low energy absorptance. In order to reduce the likelihood of fusion occurring in the fourth region, the effect of using a colorant with a relatively high energy absorption can be offset by an increased amount of fusion inhibiting agent. In some examples, any colorants applied to different regions are selected from a common colorant set.

Similar to blocks 704-708, in some examples, applying print agent to the fourth region is carried out using a print agent distributor, for example a print head which may dispense print agent using 'inkjet' techniques or the like, and which may for example move relative to the layer of build material, and may perform at least one printing pass of a layer of build material. This may be interleaved with the processes of blocks 704-708.

The amount of fusion inhibiting agent to be applied to the fourth region of the build material may also be determined based on other factors, such as an efficiency with which the fusing agent applied to the region to be fused (or for example, the second region to which the fourth region is adjacent) absorbs radiation (as this can result in heating of the fourth region), and/or the energy to be applied to the build material.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the object segmentation module 504, the control instruction module 506, the model assessment module 604 and the model slicing module 606) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A machine readable medium storing instructions which, when executed by a processor, cause the processor to:
    segment a virtual build volume comprising a representation of at least a part of an object to be generated in additive manufacturing, wherein the virtual build volume is segmented into a plurality of nested segments comprising a core segment, an inner peripheral segment and an outer peripheral segment; and generate additive manufacturing control instructions for the nested segments, wherein the additive manufacturing control instructions for each segment are generated such that:

the control instructions for the core segment are generated so as to provide a first region of the object corresponding to the core segment and having a first color;

the control instructions for the outer peripheral segment are generated so as to provide a second color for a second region of the object corresponding to the outer peripheral segment; and the control instructions for the inner peripheral segment are generated so as to:

determine a third color for a third region of the object corresponding to the inner peripheral segment, wherein the color of the third region is determined based on a color of the first color and/or the second color and to at least partially visually mask the first region; and provide the third color for the third region.

2. A machine readable medium according to claim 1 wherein the control instructions for the second region specify application of a fusing agent and at least one colorant, the fusing agent comprising a Caesium Tungsten, Bronze, or a Caesium Tungsten Oxide composition.

3. A machine readable medium according to claim 1 wherein the control instructions for the third region specify application of a fusing agent and at least one colorant, the fusing agent comprising a Caesium Tungsten, Bronze, or a Caesium Tungsten Oxide composition.

4. A machine readable medium according to claim 1 wherein the control instructions for the core segment specify application of a carbon-based fusing agent.

5. A machine readable medium according to claim 1 further comprising segmenting the virtual build volume to comprise a first external peripheral segment which is external to the representation of the object within the virtual build volume, wherein the control instructions for the first external peripheral segment are generated so as to provide the second color for a portion of build material which is external to the object.

6. A machine readable medium according to claim 5 wherein the control instructions for the external portion of build material specify a use of a fusion inhibiting agent and at least one colorant.

7. A machine readable medium according to claim 5 further comprising determining a second external peripheral segment which is external to the representation of the object within the virtual build volume, wherein the control instructions for the second external peripheral segment are generated to specify an application of a fusion inhibiting agent.

8. A machine readable medium according to claim 1, in which at least one of a number of segments and a thickness of the segments for an object region is determined based on a local object geometry.

9. An apparatus comprising processing circuitry, the processing circuitry comprising:

an object segmentation module to represent a virtual build volume comprising at least part of an object to be generated in additive manufacturing as a plurality of nested segments comprising an object core segment, an inner peripheral segment and an outer peripheral segment; and a control instruction module to generate control instructions for generating an object, wherein the generation of control instructions by the control instruction module is such that:

the control instructions for the core segment are generated so as to provide a first region of the object corresponding to the core segment and having a first color;

the control instructions for the outer peripheral segment are generated so as to provide a second color for a second region of the object corresponding to the outer peripheral segment; and the control instructions for the inner peripheral segment are generated so as to:

determine a third color for a third region of the object corresponding to the inner peripheral segment, wherein the color of the third region is determined based on a color of the first color and/or the second color and to increase an accessible color gamut of the object.

10. Apparatus according to claim 9 further comprising a model assessment module to determine, from data relating to the object, at least one of a relative volumetric composition and a shape for the segments.

11. Apparatus according to claim 9 further comprising a model slicing module to represent the virtual build volume as a plurality of slices corresponding to an integer number of object layers to be generated in layer by layer additive manufacturing.

12. An apparatus according to claim 9 further comprising an object generation apparatus to generate the object according to the control instructions.

13. A method comprising:

providing build material;

applying, to a first region of the build material which is to be fused in additive manufacturing, a first selection of print agent, wherein the first region corresponds to a core segment of an object to be generated in additive manufacturing;

applying, to a second region of the build material which is to be fused in additive manufacturing, a second selection of print agent, wherein the second selection comprises at least one colorant, and wherein the second region corresponds to an outer peripheral segment of the object;

applying, to a third region of the build material which is to be fused in additive manufacturing and which is between the first region and the second region, a third selection of print agent, wherein the third selection includes a color that is based on a color of the first region and/or a color of the second region and to at least partially visually mask the first region, and wherein the third region corresponds to an inner peripheral segment of the object; and heating the build material by exposing the build material to radiation so as to cause fusing of the first region.

14. A method according to claim 13 further comprising applying, to a fourth region of the build material which is adjacent to the second region, print agent comprising a combination of a fusion inhibiting agent and colorant, wherein the combination of the fusion inhibiting agent and colorant is applied according to a target color of the second region.

15. A method according to claim 14 comprising applying print agent comprising a colorant to the third region and the fourth region, wherein the colorants applied to the second, third and fourth regions are selected from a common colorant set.

* * * * *